(12) United States Patent
Li et al.

(10) Patent No.: US 8,257,840 B2
(45) Date of Patent: Sep. 4, 2012

(54) SECURITY FUNCTIONAL THIN FILM AND SECURITY PRODUCT CONTAINING THE FUNCTIONAL THIN FILM

(75) Inventors: Xiaowei Li, Beijing (CN); Xinyu Li, Beijing (CN); Ce Li, Beijing (CN); Jing Yang, Beijing (CN); Feng Pan, Beijing (CN); Caixia Li, Beijing (CN); Yu Cao, Beijing (CN)

(73) Assignee: China Banknote Printing And Minting Corporation, Beijing (CN)

( * ) Notice: Subject to any disclaimer, the term of this patent is extended or adjusted under 35 U.S.C. 154(b) by 734 days.

(21) Appl. No.: 12/305,966

(22) PCT Filed: Mar. 24, 2008

(86) PCT No.: PCT/CN2008/070570
§ 371 (c)(1),
(2), (4) Date: Dec. 20, 2008

(87) PCT Pub. No.: WO2009/036659
PCT Pub. Date: Mar. 26, 2009

(65) Prior Publication Data
US 2010/0220371 A1    Sep. 2, 2010

(30) Foreign Application Priority Data
Sep. 20, 2007  (CN) .......................... 2007 1 0122026

(51) Int. Cl.
*B32B 15/04* (2006.01)

(52) U.S. Cl. .................. 428/693.1; 428/195.1; 162/138; 162/140; 204/192.1; 204/192.2

(58) Field of Classification Search ......................... None
See application file for complete search history.

(56) References Cited

U.S. PATENT DOCUMENTS
4,684,795 A    8/1987   Colgate

FOREIGN PATENT DOCUMENTS
CN    1135084 A    11/1996
(Continued)

OTHER PUBLICATIONS

Jiang et al. "Formation of Nano2Grains in Amorphous Co2Nb2Zr Films and Its Magnetic Properties", Journal of Vacuum Science and Technology(China), vol. No. 25, Issue No. 1, Jan.-Feb. 2005.

*Primary Examiner* — Holly Rickman
*Assistant Examiner* — Lisa Chau
(74) *Attorney, Agent, or Firm* — CUSPA Technology Law Associates; Yi Li

(57) ABSTRACT

The present invention provides a security functional thin film and a security product containing such a thin film. The security functional thin film is of an amorphous structure, and possesses soft magnetic characteristics. Large Barkhausen effect can be detected along the in-plane preferred direction of magnetization; and the Large Barkhausen effect significantly attenuates, or no such signal can be detected, in a direction perpendicular to the in-plane preferred direction of magnetization. The thin film has a thickness of 20-300 nm, and the thin film also possesses element encoding characteristics that can be authenticated by experts. The security functional thin film of the present invention can be fabricated by magnetron sputtering web coating process. The security product provided by the present invention has a security information layer formed of the security functional thin film, and can be combined with other security characteristics for use in fabricating security materials such as security threads, security tapes, paper security strip-like inserts, or security labels, and others. Compared with conventional anti-counterfeiting technologies, the instant security functional thin film has more hidden security information, and facilitates enhancement of safety performance of security products.

20 Claims, 4 Drawing Sheets

```
┌─────────────────┐
│                 │
│      AL1        │
│                 │
├─────────────────┤
│                 │
│      AL2        │
│                 │
└─────────────────┘
```

FOREIGN PATENT DOCUMENTS

| | | |
|---|---|---|
| CN | 1332222 A | 1/2002 |
| CN | 1715560 A | 1/2006 |
| CN | 1854944 A | 11/2006 |
| JP | 60208442 A * | 10/1985 |
| JP | 6060333 A | 3/1994 |
| JP | 11016110 A | 1/1999 |
| WO | WO 00/05693 | 2/2000 |
| WO | WO 0005693 A2 * | 2/2000 |

* cited by examiner

SECURITY FUNCTIONAL THIN FILM AND SECURITY PRODUCT CONTAINING THE FUNCTIONAL THIN FILM

FIELD OF THE INVENTION

The present invention pertains to the field of anti-counterfeiting technology and relates to a security functional thin film and a security product containing such a thin film. The present invention further provides a security technique by utilizing the functional thin film material.

BACKGROUND OF THE RELATED ART

As well known, the difficulty of counterfeiting can be increased by adding security threads, or special security inserts and labels of various shapes inside or on the surfaces of security papers or plastic polymers such as banknotes, securities or bill notes. These materials can be added in the security papers or plastic polymers in the forms of polyester threads/tapes or strips with special shapes during the process of fabrication, and can also be attached to the surfaces of the security papers or plastic polymers at the final process of fabrication. These security materials are usually cut or processed from security thin films to form security threads, security tapes, and security inserts or labels of various shapes.

As an effective measure against counterfeit, security threads have long been used for security papers such as banknotes. Earlier security threads were applied as metal threads having circular cross-sections that were positioned longitudinally along the paper machine and continuously applied. A later developed security thread typically was a metallized polymer, whose carrier was flat-shaped in cross-section. Such a flat-shaped security thread is applied in two modes in security papers, one of which is the open mode, wherein the security thread is partially embedded inside the paper and partially exposed on the paper surface; another is the insertion mode, wherein the entire security thread is completely embedded in the paper. Embedment of the security thread into the security paper provides a primary public security visible to the naked eye.

To enhance anti-counterfeit performance of the security thread, people has provided it with optical security information and/or magnetic security information during the process of fabricating the security thread. Chinese patent application CN 1715560A discloses a security thread for enhancing security of paper. This security thread contains both optical security information and magnetic security information, as the security thread has a holographic security layer formed of a molded layer and a metal reflection layer with optical security images, and has a magnetic security information layer formed of magnetic particles and resins such as cellulose. During the process of applying the security thread to the security paper, the security thread tends to be longitudinally elongated due to longitudinal traction of the paper machine, and when the security thread is longitudinally elongated to a certain extent, a portion of machine-readable magnetic security information can be lost, which causes inferior stability of machine-readable electromagnetic characteristics to the detriment of anti-counterfeit performance.

On the other hand, the conventional magnetic security thread is fabricated by coating a magnetic material having a purely metallic type or metallic ferromagnetic powders or coating printing ink on substrates such as PET. Its disadvantages are the necessity to use nonmagnetic substances such as adhesives and the requirement for the thickness to reach about several microns, whether it is coating a magnetic material or printing magnetic security ink. Consequently, the fabricated security thread appears too thick relative to the material of a thin film type. Placement of such a magnetic security thread in a sheet of paper would render it difficult to smooth the surface of the paper, thus affecting subsequent printing process. Moreover, the thickness of several microns of a printed magnetic security functional ink layer can also create environmental problems due to volatilization of organic solvents in the preparation process.

The security tape is usually adhered on the surface of a security paper or a security plastic polymer, and the security tape may contain many types of security information. U.S. Pat. No. 4,684,795 (Security Tape with Integrated Hologram and Magnetic Strip) discloses a security tape for use on identification cards, wherein a magnetic layer containing a ferrous oxide as the main component is sandwiched between an optical security nonmagnetic layer with a hologram and a plastic base layer of the identification card. The magnetic layer in this patent still belongs to conventional magnetic security, i.e., it is still a security measure that makes use of a magnetically hard material to provide machine-readable signals.

Amorphous alloy materials have many excellent characteristics, and have been a focus of attention in research, development and application in the materials science as a novel functional material. Relatively common applications include using these materials as composite reinforcing materials in strengthening component parts of products; there are also many applications as soft magnetic materials for use in various transformers and sensors. Applications of amorphous materials in the field of security detection are limited to anti-theft labels sandwiched in books or goods in the form of amorphous alloy strips, wherein alarm is triggered upon receiving a change in waveforms by the device. For instance, international application WO 00/05693 relates to an antitheft label made of multilayered film of 100-2000 nm containing amorphous soft magnetic thin film. Despite the described alloy component being suitable for use as antitheft label, one defect of the technical solution of this invention lies in its over simplification for use in the field of advanced anti-counterfeit of securities, exhibited as no definite directional requirement of the detection signal. Moreover, for use as an antitheft label, there are also certain requirements on the amorphous film as demanded by the detection sensitivity: first, the film should have certain thickness (to enable three-dimensional detection, it is usually required that the thickness of the thin film is about 1000 nm for use in the antitheft label); and to facilitate detection, it is also desirable to minimize the interference originated by the material itself; therefore, there are also specific requirements on the elemental composition of the amorphous film.

It is because the property of the amorphous alloy is closely related to its composition, although currently there have been many reports on amorphous alloy materials and their applications, so far there is no report about research on utilizing the amorphous alloy materials to provide the security information layer.

SUMMARY OF THE INVENTION

The primary technical problem to be solved by the present invention is to provide a functional thin film having security functions. The thin film possesses both specific magnetic characteristics and chemical element encoding, and is used for fabricating security products such as security threads, security tapes or security labels. In comparison with prior art anti-counterfeit technology, the functional thin film has more hidden security information, therefore, benefits enhancement of security functions of the security product.

The present invention further provides a security product containing such a functional thin film, which can combine the primary public security characteristics with secondary and tertiary security characteristics such as luminescence security function, to provide a security material more suitable for use in the field of advanced anti-counterfeit securities.

The present invention first provides a security functional thin film, which comprises the following characteristics:

1) elemental composition of the thin film has the following formula, enabling chemical element encoding:

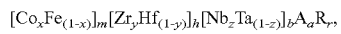

where each subscript in the formula indicates atomic ratio, which satisfies the numerical relationship of: total number of atoms $m+h+b+r+a=100$; and $x=0-1$, $y=0-1$, $z=0-1$, $96 \geq m \geq 75$, $0 < h \leq 20$, $0 < b \leq 20$, $0 < a \leq 12$, $0 < r \leq 4$; in the formula A is one or more metallic elements selected from Mo, Ni, Ru, Pd, Pt, Ti; and R is one or more rare-earth elements;

2) the thin film is of an amorphous structure;

3) the thin film has soft magnetic characteristics, and has the following in-plane magnetic anisotropy characteristics that can be detected by machine-readable security detection: Large Barkhausen effect is present along the in-plane preferred direction of magnetization, and the Large Barkhausen effect substantially attenuates, or no such signal can be detected, in the direction perpendicular to the in-plane preferred direction of magnetization; and 4) the thin film has a thickness of 20-300 nm.

The present invention actually provides a novel amorphous security functional thin film. Because of its specific magnetic characteristics, a special signal having magnetic characteristics can be detected from the film in a predetermined direction by means of a device, thereby providing machine-readable security detection. At the same time, the elemental composition possessed by the thin film of the present invention provides a specific chemical element encoding, and also provides a tertiary security measure.

One of the important features of the security functional thin film of the present invention is that the film possesses the in-plane magnetic anisotropic security signal, which is not possessed by ordinary soft magnetic powder materials, and the functional thin film of the present invention can be machine-readably detected.

The element encoding and magnetic characteristics possessed by the amorphous thin film of the present invention are all originated from the composition and properties of the thin film itself, therefore, there is no need to coat or print magnetic materials. When the thin film is used as a security thread in a security paper, the thickness of its magnetic security functional layer is reduced by at least one order of magnitude in comparison with that of a conventional security thread, thereby reducing the thickness of the entire security thread, and facilitating improvement of printing adaptability in the subsequent paper printing process. Moreover, since the printing process is eliminated, potential environmental problems caused by volatilization of organic solvents are avoided.

In specific embodiments of the present invention, the thickness of the amorphous security functional thin film can be controlled at 50-200 nm, which satisfies the requirement for the security information provided by the element encoding and magnetic characteristics of the thin film itself; and reduction of the thickness of the thin film also facilitates its application as security materials such as the security thread.

The present invention further provides a method for fabricating the security functional thin film. The thin film can be produced by a magnetron sputtering web coating process; the thin film formed is provided with in-plane magnetic anisotropy by means of a tensile force in a winding direction during the fabrication process, and its preferred direction of magnetization is along the winding direction.

The magnetron sputtering web coating process is a common technique employed in fabricating magnetic thin films. In the present invention, by providing a determined elemental composition of the thin film and by causing the thin film to receive certain tensile force in the winding direction, the formed thin film can have in-plane magnetic anisotropy. During the process of winding, a certain level of tensile force is applied to the thin film itself, and the preferred direction of magnetization of the formed thin film is along the winding direction. When being detected by a pertinent device, a significant Large Barkhausen effect can only be detected in-plane along the winding direction, whereas the same Large Barkhausen effect is nearly undetectable or can not be detected at all in the direction perpendicular to the in-plane preferred direction of magnetization (the winding direction). A security material made of such a thin film possesses expert-grade element encoding characteristics, moreover, its machine-readable security information is more hidden.

To provide the security functional thin film with desired magnetic characteristics, the present invention further provides a second method for fabricating the security functional thin film. The method comprises employing magnetron sputtering web coating process, and simultaneously applying a directional magnetic field along the winding direction (for instance, applying an external magnetic field of about 1000 Oe parallel to the direction of the film plane), such that the thin film formed has in-plane magnetic anisotropy. Similarly, the amorphous thin film fabricated by this method possesses both specific element encoding characteristics and more hidden magnetic characteristics.

In one embodiment of the present invention, directional magnetic field can be applied along the winding direction by placing permanent magnets in an order on top portions of partitions between target chambers, to cause the thin film having in-plane magnetic anisotropy.

In fabricating the amorphous functional thin film of the present invention using the magnetron sputtering web coating technique, the substrate of the amorphous thin film used for depositing selected components can be a regular substrate (such as PET film), or various thin films that have already been incorporated with security information.

Accordingly, in another aspect the present invention is directed to application of the aforementioned amorphous security functional thin film in the field of anti-counterfeiting. The present invention provides a novel security product containing a security information layer that includes at least the security functional thin film described above.

According to the embodiments of the present invention, the security product can be made of the aforementioned amorphous thin film, or made of a thin film of a composite structure formed by the aforementioned amorphous functional thin film and other functional material layers or thin films.

In specific embodiments of the present invention, the security information layer incorporated in the security product can include a composite structure having two or more layers of the aforementioned amorphous thin film. The two or more layers of the amorphous thin film can have the same or different elemental compositions. The two or more, same or different, amorphous layers can be formed by employing respective target materials in the magnetron sputtering process, and at least one of the two amorphous layers has aforementioned alloy component. For example, this amorphous layer can be a double-layered film formed by magnetron sputtering with $Co_{77}Zr_8Nb_{10}Ni_3Y_2$ target, $Fe_{82}[Zr_{0.75}Hf_{0.25}]_6[Nb_{1/3}Ta_{2/3}]_6Mo_3Er_1Y_2$ target, or $Co_{88}Zr_4Nb_6Y_2$ target.

In one embodiment of the present invention, the security information layer of the security product can also include a composite layer having a sandwich structure, of which the upper and lower layers are the same or different amorphous thin films described above and the intermediate layer is a metal layer, for instance, of Cu, Ag, Au or Al. The upper and lower amorphous thin films can be any amorphous thin films satisfying the requirements of the aforementioned element encoding and magnetic characteristics. This sandwich structured composite thin film can exhibit great magnetic resistance (GMR) effect or great magnetic impedance (GMI) effect, and can provide a signal to other detection methods.

In another embodiment of the present invention, the security information layer of the security product can include a composite layer having a structure of multilayered films, particularly, a composite film structure having more than two layers of the security functional thin film described above and metal layers interposed therebetween. For instance, the amorphous layers can be interposed with metal layers, Cu or Ag, to form a structure of multilayered films with interposing amorphous layers and metal layers. One advantage of such a multilayered film structure is enhancement of malleability of the material. As such, when the material is stretched in a certain range of intensity, the composite film structure has a stronger resistance to damage than pure amorphous layers, therefore, rendering it more difficult to break the film surface.

Furthermore, the security functional thin film of the present invention can be combined with existing thin film materials capable of providing security detection to obtain security products having various composite structures. In one embodiment of the present invention, the security information layer of the security product is a composite structure including at least one layer of the security functional thin film described above and an optical holographic film, wherein the amorphous security functional thin film replaces the aluminum optical reflection layer. More specifically, the optical holographic film can be a hard-pressed holographic film or a soft-pressed holographic film.

In another embodiment of the present invention, the security information layer of the security product is a composite structure including at least one layer of the amorphous security functional thin film and an optically variable security thin film. More specifically, the optically variable security thin film can have a structure of absorption layer-dielectric layer-reflection layer.

In other embodiments of the present invention, the security information layer can be a composite structure formed by attaching a luminescent material layer to the surface of the security functional thin film. A security product thus obtained becomes a composite security material having optical security characteristics, electromagnetic security characteristics and chemical element encoding characteristics, and therefore possesses improved anti-counterfeit effects. The luminescent material can be any one of the materials or combinations thereof having optical security characteristics as known in the anti-counterfeit field, for instance, photoluminescent material, cathode ray luminescent material, electroluminescent material, X-ray luminescent material, and thermoluminescent material, or any combination thereof. All of these luminescent materials are known and frequently used in the art, and they can be attached to the surface of the functional thin film by coating or printing.

In another embodiment of the present invention, a luminescent substrate is used in the security product to support the security information layer. The composition of the substrate includes a luminescent material, or the surface of the substrate is attached with a luminescent material. The luminescent material can be photoluminescent material, cathode ray luminescent material, electroluminescent material, X-ray luminescent material, thermoluminescent material, or a combination thereof. Accordingly, the present invention provides another composite security functional material having electromagnetic security characteristics, luminescent security characteristics and chemical element encoding characteristics.

In the embodiments described above, the luminescent substrate is obtained by adding the luminescent material into or coating the luminescent material on the surface of the substrate at the time of fabricating the polymer substrate. The fabrication process can be any method known in the art.

As can be understood, the present invention utilizes the security product fabricated of an amorphous thin film, by means of the specific element encoding and soft magnetic characteristics possessed by the amorphous thin film, to provide expert-grade tertiary security and machine-readable in-plane magnetic anisotropic characteristics, respectively. As such, the security information is rendered more professional and hidden. The security product of the present invention can replace existing security materials such as security strips (paper security strip-like inserts), security threads, security tapes, and others. When being placed in articles which need be monitored as to security, for instance, in securities such as banknotes, checks and etc., the security product does not lose information because of traction or other exertion of forces in the process of incorporation. On the other hand, since the security information recorded in the amorphous thin film of the present invention is obtained by providing a selected elemental composition and application of a magnetic field during the fabrication process, the thickness of the thin film can be substantially reduced. When being placed as security thread or security tape in carriers such as paper, printing adaptability of the paper is not affected.

In one application, the security product of the present invention can be position-fixedly placed in a sheet of paper as a security strip or marker, for instance, placed in a security paper, to replace existing security thread or security tape for the fabrication of securities such as banknotes, checks and security documents.

SPECIFIC EMBODIMENTS

Technical solutions and advantageous effects of the present invention are described in detail below with reference to specific embodiments to help readers better understand the substance of the solutions of the present invention. It is noted that these embodiments shall not be understood as restrictions to the scope of implementation of the present invention.

Notes: the "security functional thin film" provided by the present invention can also be referred to as an amorphous thin film having specific element encoding. Therefore, the term "security functional thin film", or "amorphous thin film", or "amorphous information layer" used in the Summary of the Invention and the Specific Embodiments sections of the present invention should be understood to refer to the thin film with the same meaning. The "security product" provided by the present invention refers to a security material obtained by processing the security thin film of the present invention or the combination of the thin film with other functional materials, which is also referred to as "security material" or "composite security thin film" in the present invention. The security product of the present invention possesses desirable security characteristics, and can be applied in various articles that need be endowed with security information, to provide excellent security features to the articles.

Example 1

Figure 1:
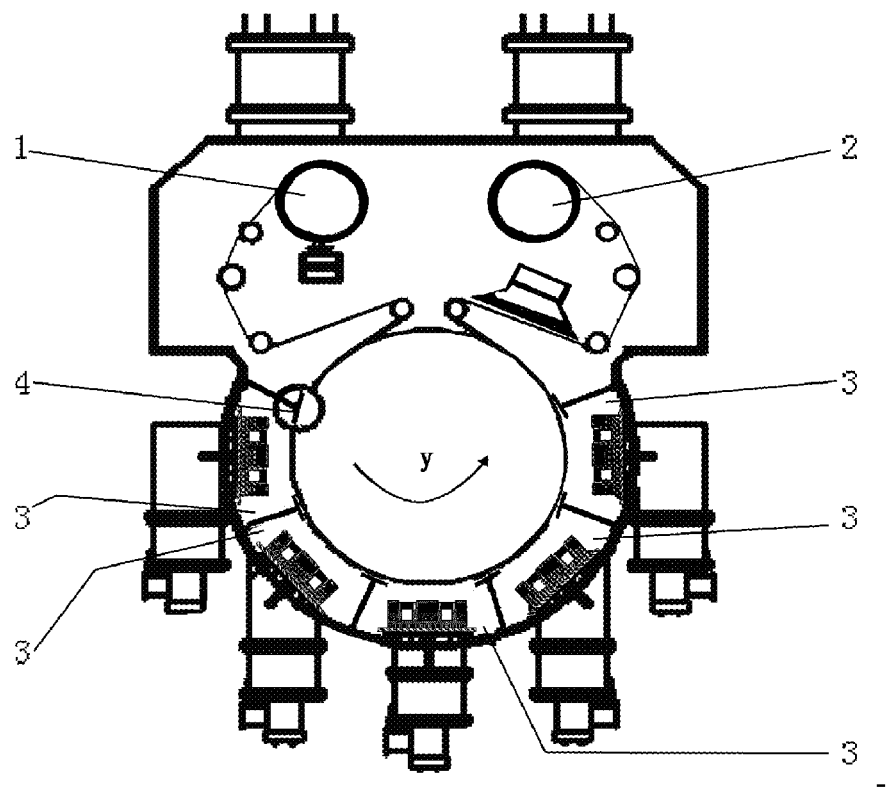
FIG. 1 is a view illustrating the magnetron sputtering web coating device for fabricating the security functional thin film and the fabrication process of the present invention; reference numerals in the figure indicate the following: 1—wind-off substrate roll not deposited with a target material; 2—wind-up thin film roll deposited with a target material; 3—target chamber; 4—top portion of a partition of a target chamber; y—winding direction.

An amorphous thin film material having a composition of $Co_{77}Zr_8Nb_{10}Ni_3Y_2$ (x=y=z=1, $R_r=Y_2$) is obtained by using a PET film (film roll) having a thickness of 26 μm as the substrate, and by sputtering an alloy target material having corresponding components in a magnetron sputtering web coating process carried out using the device as shown in FIG. 1.

In the coating process shown in FIG. 1, the PET wind-off substrate 1 is wound clockwise along the direction indicted by the arrow y, and passes through the alloy target material in the target chamber 3 (there are five independently controlled target chambers in the magnetron sputtering web coating device shown in FIG. 1) to complete the coating process. In the process of winding, the tensile force applied to the substrate is controlled at 90N; and after the substrate is deposited with the target material, it is wound up as a thin film roll 2 to obtain an amorphous thin film having a thickness of 120 nm.

A Large Barkhausen effect signal can be detected in-plane along the winding direction of the coating process, whereas the Large Barkhausen effect signal significantly attenuates in the direction perpendicular to the winding direction. The specific elemental composition of the thin film can be further provided with a specific element encoding as determined by experts, which results in a security functional thin film.

Example 2

An amorphous thin film material having a composition of $Fe_{82}[Zr]_6[Nb_{1/3}Ta_{2/3}]_6Mo_3Er_1Y_2$ (x=0, y=1, z=1/3, $R_r=Er_1Y_2$) can be obtained by using a PET film (film roll) having a thickness of 20 μm as the substrate, and sputtering an alloy target material having corresponding components by the magnetron sputtering web coating process. Both the fabrication device and the operational procedure are the same as those of Example 1, except that the tensile force applied to the substrate is 70N in the process of web coating and winding. The obtained amorphous thin film has a thickness of 260 nm.

The magnetic characteristics and element encoding characteristics of this thin film are the same as those obtained in Example 1. A Large Barkhausen effect signal can be detected along the winding direction of the coating process, whereas the Large Barkhausen effect signal significantly attenuates in the direction perpendicular to the aforementioned direction.

Example 3

An amorphous thin film material having a composition of $[Co_{0.8}Fe_{0.2}]_{80}[Zr_{0.75}Hf_{0.25}]_5[Nb_{0.25}Ta_{0.75}]_8Ru_2Pd_2Dy_1Y_2$ (x=0.8, y=0.75, z=0.25, $R_r=Dy_1Y_2$) can be obtained by using a PET film (film roll) having a thickness of 20 μm as the substrate, and sputtering an alloy target material having corresponding components by the magnetron sputtering web coating process. Both the fabrication device and the operational procedure are the same as those of Example 1, except that the tensile force applied to the substrate is 70N in the process of web coating and winding. The obtained thin film has a thickness of 200 nm.

The magnetic characteristics and element encoding characteristics of the thin film are the same as those obtained in Example 1. A Large Barkhausen effect signal can be detected along the winding direction of the coating process, whereas the Large Barkhausen effect signal significantly attenuates in the direction perpendicular to the aforementioned direction.

Example 4

An amorphous thin film material having a composition of $Co_{88}Zr_4Nb_6Y_2$ (x=y=z=1, $R_r=Y_2$) can be obtained by using a PET film (film roll) having a thickness of 20 μm as the substrate, and sputtering an alloy target material having corresponding components by magnetron sputtering web coating process. Both the fabrication device and the operational procedure are the same as those of Example 1, except that the tensile force applied to the substrate is 70N in the process of web coating and winding. The obtained thin film has a thickness of 50 nm.

The magnetic characteristics and element encoding characteristics of the thin film are the same as those obtained in Example 1. A Large Barkhausen effect signal can be detected along the winding direction of the coating process, whereas the Large Barkhausen effect signal significantly attenuates in the direction perpendicular to the aforementioned direction.

Example 5

An amorphous thin film material having a composition of $Fe_{80}[Zr_{0.5}Hf_{0.5}]_4Ta_6Y_2$ ($x=z=0$, $y=0.5$, $R_r=Y_2$) can be obtained by using a PET film (film roll) having a thickness of 30 μm as the substrate, and sputtering an alloy target material with corresponding components by magnetron sputtering web coating process. Both the fabrication device and the operational procedure are the same as those of Example 1, except that the tensile force applied to the substrate is 120N in the process of web coating and winding. The obtained thin film has a thickness of 130 nm.

The magnetic characteristics and element encoding characteristics of the thin film are the same as those obtained in Example 1. A Large Barkhausen effect signal can be detected along the winding direction of the coating process, whereas the Large Barkhausen effect signal significantly attenuates in the direction perpendicular to the aforementioned direction.

Example 6

Figure 2:
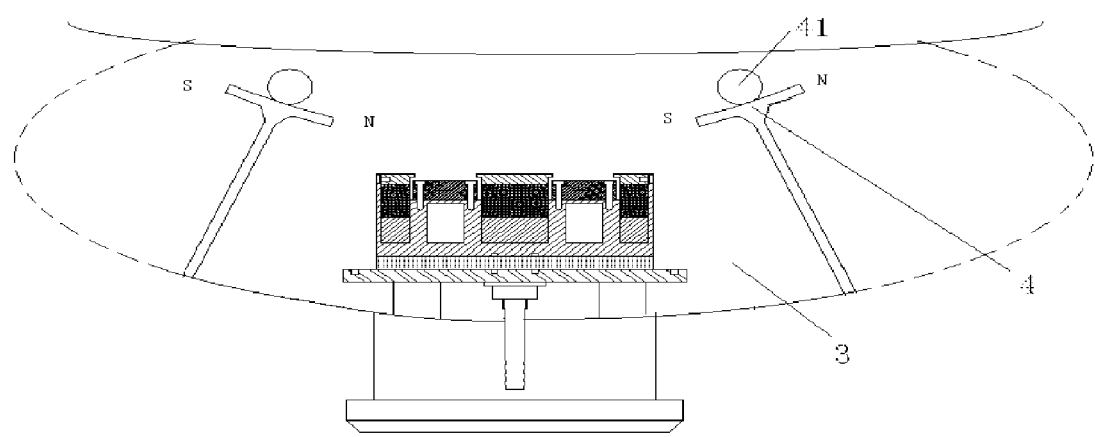
FIG. 2 is an amplified view illustrating the arrangement of magnetic poles in the target chamber of the magnetron sputtering web coating device for fabricating the security functional thin film of the present invention.

The PET film as the substrate and the target material used in this example are the same as those described in Examples 1-5, respectively. The amorphous thin film material is also fabricated by the magnetron sputtering web coating process described in Examples 1-5, using the device with the basic structure shown in FIG. 1, except that magnets (N48 neodymium-iron-boron permanent magnet having a surface magnetic field intensity of about 0.1-0.2 T) are placed on a top portion 4 of a partition of the target chamber 3, and magnetic poles of each magnet 41 are arranged in the order of S-N as shown in FIG. 2. Therefore, a magnetic field along the winding direction can be applied near the film surface during the process of web coating, which results in an amorphous thin film material having an in-plane preferred direction of magnetization along the winding direction.

The magnetic characteristics and element encoding characteristics of the thin film are the same as those obtained in Example 1.

Example 7

Figure 3:
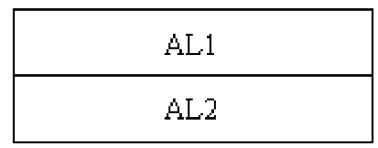
FIG. 3 is a view illustrating a security material of a composite structure including two layers of security functional thin film of the present invention.

A layer of amorphous thin film AL1 is deposited first on the substrate according to the methods described in Examples 1-6, and then another layer of amorphous thin film AL2 is deposited (for instance, the five target chambers 3 are divided into two groups, compositions of AL1 and AL2 are placed in, respectively, as the corresponding target materials), to obtain the information layer of an amorphous security functional material having a double-layered composite structure, as shown in FIG. 3.

The amorphous information layers AL1 and AL2 in this example can be any one of the security functional thin films described in Example 1-5, and the two layers have different element encoding information.

Example 8

Figure 4:
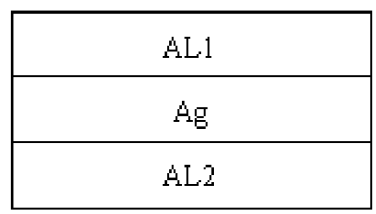
FIGS. 4-6 are views illustrating respective embodiments of the security product having a sandwich structure of the present invention.

A security material (product) having a composite information layer of a sandwich structure is fabricated according to the methods described in Examples 1-6. An amorphous information layer AL1 is deposited first, whose element encoding and depositing method can be any one described in Examples 1-6, and then a layer of Ag is deposited. Subsequently, a same or a different amorphous information layer AL2 is deposited, whose element encoding and depositing method can also be any one described in Example 1-5, which forms the structure of a sandwich film layer as shown in FIG. 4.

As a variation of this embodiment, a metal Ag layer (or other metal layer) and then an amorphous information layer can be further deposited sequentially on the surface of the amorphous information layer AL1 or AL2, to form a structure of multilayered film with interposing amorphous layers and metal layers.

Example 9

Figure 5:
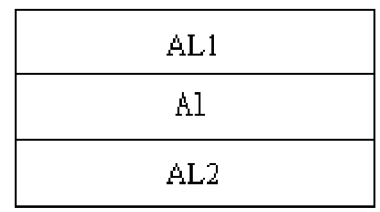

As shown in FIG. 5, a security product having an amorphous information layer of a sandwich structure is fabricated using the same method described in Example 8, except that the intermediate layer in the sandwich structure is an Al layer.

Example 10

Figure 6:
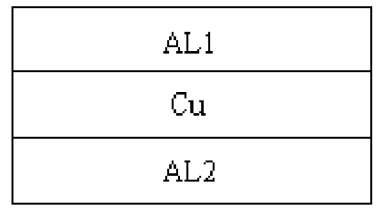

As shown in FIG. 6, a security product having an amorphous information layer of a sandwich structure is fabricated using the same method described in Example 8, except that the intermediate layer in the sandwich structure is a Cu layer.

Example 11

Figure 7:
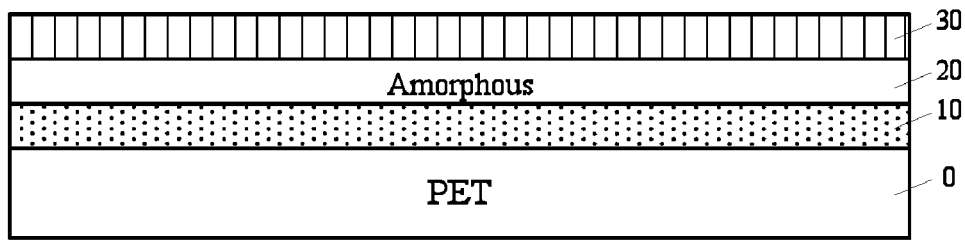
FIG. 7 is a cross-sectional view illustrating a security product of the present invention, formed of a composite of the security functional thin film and a hard-pressed holographic film.

A composite security product is fabricated, and the security information layer of the security product is a composite structure of an amorphous film and a holographic thin film. The cross-section of this security product is shown in FIG. 7. The amorphous thin film layer is deposited using the magnetron sputtering process. A PET substrate hard-pressed with a holographic pattern (base layer 0 plus hard-pressed holographic layer 10 in the figure) is selected as the substrate. An amorphous information layer 20 is deposited on the substrate, and then a protective layer 30 is coated thereon. The security material is a composite thin film product including a base layer 0, a hard-pressed holographic layer 10, an amorphous information layer 20 and a protective layer 30. The amorphous layer 20 in this thin film product functions, on one hand, as a magnetic layer to provide a machine-readable security signal; and on the other hand, it functions as a reflection layer, in replacement of the Al layer of a conventional holographic thin film.

The composition and depositing method of the amorphous information layer 20 in this thin film material are any of those described in Examples 1-6.

Example 12

Figure 8:
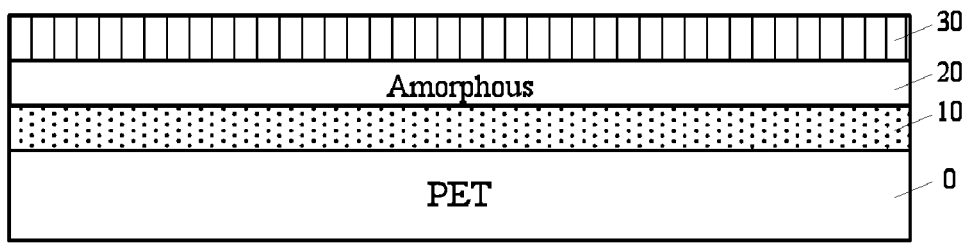
FIG. 8 is a cross-sectional view illustrating a security product of the present invention, formed of a composite of the security functional thin film and a soft-pressed holographic film.

A security thin film having a composite structure is fabricated using the same method described in Example 11, except that the substrate on which the amorphous layer is deposited is a PET substrate soft-pressed with a holographic pattern (base layer 0 plus soft-pressed holographic layer 10) as shown in FIG. 8.

Example 13

Figure 9:
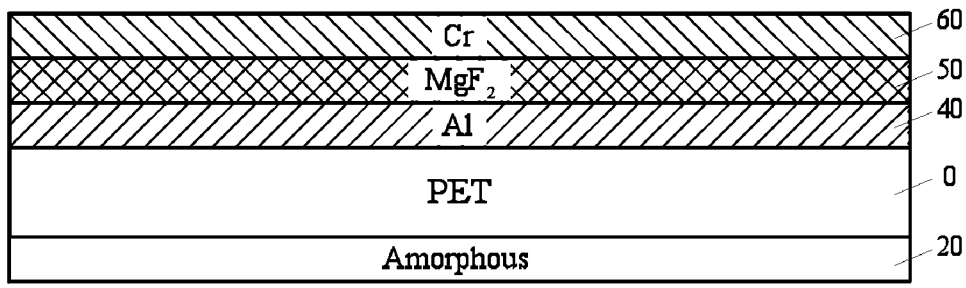
FIG. 9 is a cross-sectional view illustrating a composite security product formed by combining the security functional thin film of the present invention with an optically variable substrate.

A security material (product) having a composite security structure is fabricated by combining an amorphous thin film with an optically variable information layer. Similarly, the amorphous layer (magnetic layer) to be deposited can be any one of those described in Examples 1-6. When the amorphous thin film layer is deposited by the magnetron sputtering web coating process, the selected substrate (base film) is an optically variable polymeric thin film, as shown in FIG. 9. The optically variable substrate includes a PET base layer 0, and an Al reflection layer 40, a dielectric layer 50 formed of $MgF_2$, and an absorption layer 60 formed of metal Cr, arranged sequentially on the base layer 0. On another surface of the PET base layer of the substrate is deposited an amorphous material to form an information layer 20 (magnetic layer), with which it forms a final security thin film product with a composite information layer having element encoding and specific machine-readable magnetic characteristics and optically variable characteristics.

Example 14

Figure 10:
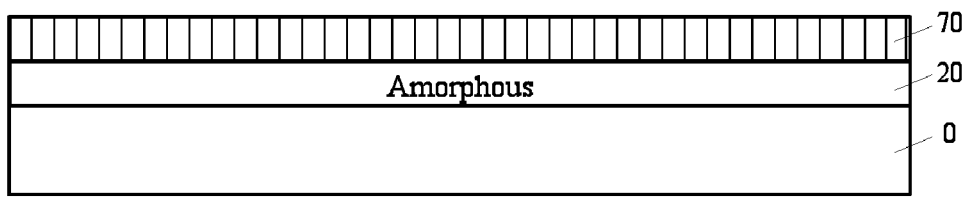
FIG. 10 is a cross-sectional view illustrating a composite security product formed by coating or printing a luminescent material layer on the security functional thin film of the present invention.

According to mass ratios, 30 parts of ethylene-vinyl acetate (EVA) copolymer, 40 parts of terpene resin, 10 parts of microcrystal wax, 0.5 part of antioxidant 2,6-ditertiary-butyl-p-cresol (BHT), and 20 parts of penetration fluorophores $Y_2O_2S$:Eu (red)+(Zn,Cd)S:Cu, Ni (green) or $YVO_4$:Eu (red)+(Zn,Cd)S:Ag, Ni (green) are mixed at 180° C. to be substantially uniform, and then the mixture is coated or printed on the surface of an amorphous thin film 20, which covers the surface and forms a luminescent material layer 70. The structure of the obtained composite security thin film is shown in FIG. 10, wherein the amorphous thin film 20 can be selected from any one of those described in Examples 1-6. This composite security thin film not only possesses the specific electromagnetic effects and chemical element encoding of an amorphous thin film, but also emits red light under excitation of a low-energy electron beam; moreover, it generates visible lights of red, orange, yellow and green colors with an increase in voltage, as the red light attenuates and the green light gradually enhances with the voltage increase. When such a composite material is fabricated into a security thread and applied in a sheet of paper, the ethylene-vinyl acetate (EVA) copolymer partially softens and melts down at approximately 150° C. due to their thermoplasticity, and this facilitates integration of the security thread with fibers of the paper for use in paper anti-counterfeiting.

Example 15

According to mass ratios, 40 parts of polyethylene terephthalate (PET), 50 parts of petroleum resin, and 1 part of antioxidant phosphorous acid ester are thoroughly mixed at 190° C. to be substantially uniform, and then 10 parts each of X ray image light excited fluorophore BaFCl:Eu and BaFBr:Eu system materials are added and mixed to be substantially uniform. The mixture is coated or printed on the surface of an amorphous thin film 20, which covers the surface and forms a luminescent material layer 70. The structure of the obtained composite security thin film is shown in FIG. 10, wherein the amorphous thin film can be selected from any one of those described in Examples 1-6. This composite material possesses the specific electromagnetic characteristics and chemical element encoding characteristics of an amorphous thin film; moreover, when exposed to radiation of X ray, the X ray image light excited fluorophore BaFCl:Eu and BaFBr:Eu system materials on the upper surface layer of the composite material stores radiation energy, and it emits blue-purple light corresponding to the energy of X ray when scanned by He—Ne laser. The polyethylene terephthalate (PET) has thermoplasticity, which benefits fabrication of the composite material into security threads for use in paper anti-counterfeiting.

Example 16

According to mass ratios, 40 parts of polypropylene (PP), 40 parts of rosin, and 0.5 part of antioxidant thiodipropionate are mixed under melting condition, and then 20 parts each of rare-earth oxysulfide $Gd_2O_2S$:Tb and $La_2O_2S$:Tb are added and mixed to be substantially uniform. The mixture is coated on the surface of an amorphous thin film 20 to form a luminescent material layer 70. The structure of the obtained composite security thin film is shown in FIG. 10, wherein the amorphous thin film can be selected from any one of those described in Examples 1-6. Under excitation of X ray, the rare-earth oxysulfide in the composite thin film can emit a green visible light, which can be used for anti-counterfeiting.

Example 17

Figure 11:
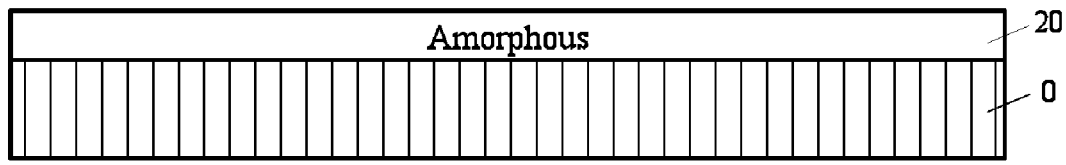
FIG. 11 is a cross-sectional view illustrating a security product of the present invention, formed of a composite of the security functional thin film and an optically variable thin film.

A PET base film added with different fluorescent powders during the process of fabrication is used as a luminescent substrate 0, and an amorphous thin film 20 is deposited on the surface of the substrate, according to any one of the methods described in Examples 1-6, to obtain a security product of the present invention as shown in FIG. 11. Under excitation of 254 nm ultraviolet ray, since the composition of the substrate is added with fluorophores, the luminescent substrate can emit a corresponding fluorescent light: for instance, a substrate added with $Y_2O_3$: $Eu^{3+}$ emits a red fluorescent light, a substrate added with $BaMg_2AL_{16}O_{27}$: $Eu^{2+}$ emits a blue fluorescent light, and a substrate added with $Ce_{0.67}Tb_{0.33}Al_{11}O_{19}$ emits a green fluorescent light. Deposition of the amorphous thin film on such a PET base film added with fluorescent powders can obtain a composite security functional material having electromagnetic characteristics, chemical element encoding characteristics and fluorescent luminescent characteristics.

Variation of this Example: the fluorescent powders are coated on the surface of the PET base film to form the luminescent substrate 0, and then a security product having the same security characteristics is obtained by the same procedure.

Example 18

A thin film is deposited on the surface of a luminescent substrate according to any one of the methods described in Examples 1-6. The luminescent substrate 0 is selected from a PET base film to which two types of fluorescent powders are added during the process of fabrication, namely $Y_2O_3$:$Eu^{3+}$ and $Sr_2SiO_8.2SrCl_2$:$Eu^{2+}$. The formed composite security thin film is shown in FIG. 11. Under excitation of 254 nm ultraviolet ray, $Y_2O_3$:$Eu^{3+}$ emits light, and the composite security thin film exhibits a red fluorescent light; while under excitation of 365 nm ultraviolet ray, $Sr_2SiO_8.2SrCl_2$:$Eu^{2+}$ emits light, and the composite security thin film exhibits a blue light. Use of such a composite thin film can obtain a composite security functional material having electromagnetic characteristics, chemical element encoding characteristics and dual wave band fluorescent luminescent characteristics.

The luminescent substrate of this Example can also be a composite PET base film coated with the aforementioned two types of fluorescent powders, and the fabricated composite security thin film has the same security characteristics.

Example 19

The coated film roll obtained in any one of Examples 1-18 is punched into small wafers having a diameter of 2-6 mm (or strip-like thin films of 2-6 mm diameter).

Figure 12:
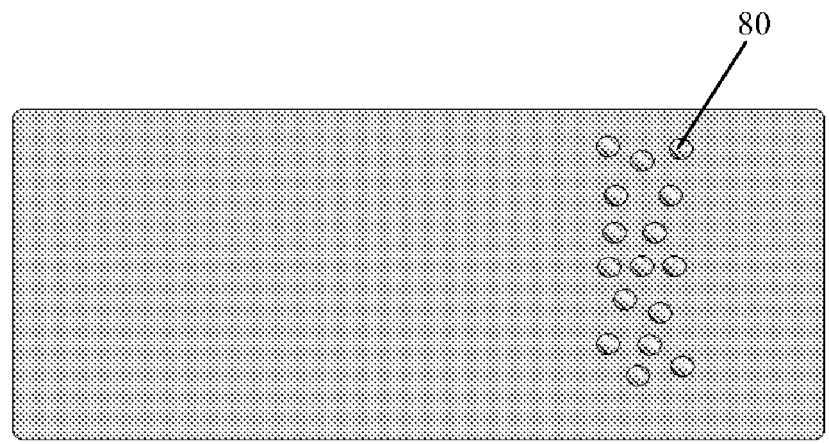
FIG. 12 is a view showing small machine-readable security wafers punched out of a security product of the present invention and placed in a sheet of paper.

These wafers 80 are position-fixedly placed in a sheet of paper using security thread placing technique, as shown in FIG. 12, to form security markers. The magnetic characteristics can be directionally detected by a detector, and element encoding of the thin film provides a means of expert security authentication.

Example 20

The coated film roll obtained in any one of Examples 1-18 is cut along the winding direction using conventional cutting technique to produce a novel security thread. Dependent on the selection of the substrate of the coating process (for instance, according to Examples 11-18), such a security thread possesses different primary security characteristics in addition to the inherent security characteristics of the thin film security functional material itself.

Figure 13:
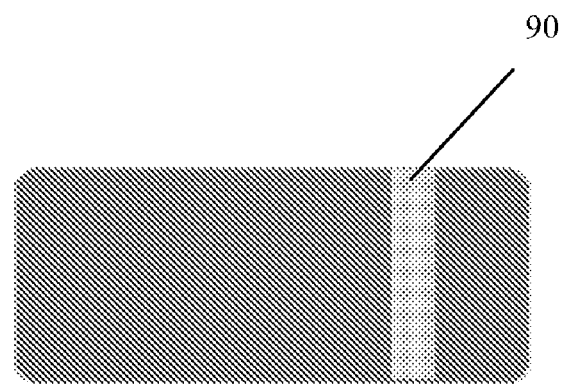
FIG. 13 is a view illustrating the placement of a security product of the present invention as a security thread in a sheet of paper.

Such a novel security thread 90 is position-fixedly placed in a sheet of paper, as shown in FIG. 13. It possesses excellent machine-readable security characteristics: a Large Barkhausen effect signal is present when detection is performed along the direction of the length of the thread, whereas no signal can be detected in the direction perpendicular to the length of the thread. As such, the security information is more hidden.

Of course, a security paper, such as various securities, placed with such a security thread can also provide expert-grade tertiary security characteristics because the security thread is deposited with a specific amorphous material.

The invention claimed is:

1. A security functional thin film, the thin film comprising the following characteristics:
   1) elemental composition of the thin film having the following formula enabling chemical element encoding:

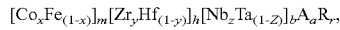

$$[Co_xFe_{(1-x)}]_m[Zr_yHf_{(1-y)}]_h[Nb_zTa_{(1-z)}]_bA_aR_r,$$

where each subscript in the formula indicates atomic ratio, satisfying a numerical relationship of: total number of atoms m+h+b+r+a=100; and x=0-1, y=0-1, z=0-1, $96 \geq m \geq 75$, $0 < h \leq 20$, $0 < b \leq 20$, $0 < a \leq 12$, $0 < r \leq 4$; A in the formula is one or more metallic elements selected from Mo, Ni, Ru, Pd, Pt, and Ti; and R is one or more rare-earth elements;
   2) the thin film being an amorphous structure;
   3) the thin film having soft magnetic characteristics, and having the following in-plane magnetic anisotropy characteristics detectable by machine-readable security detection: Large Barkhausen effect being present along in-plane preferred direction of magnetization, while the Large Barkhausen effect significantly attenuates, or no signal thereof can be detected, in a direction perpendicular to the in-plane preferred direction of magnetization; and
   4) the thin film having a thickness of 20-300 nm.

2. The security functional thin film according to claim 1, wherein the thickness of the thin film is 50-200 nm.

3. A method for fabricating the security functional thin film according to claim 1, characterized in that magnetron sputtering web coating process is employed, with application of a tensile force in a winding direction, to form the thin film having in-plane magnetic anisotropy, wherein the in-plane preferred direction of magnetization thereof is along the winding direction.

4. A method for fabricating the security functional thin film according to claim 1, comprising employing magnetron sputtering web coating process, and simultaneously applying a directional magnetic field along a winding direction, thereby forming the thin film having in-plane magnetic anisotropy.

5. The method according to claim 4, wherein applying the directional magnetic field along the winding direction is achieved by sequentially placing permanent magnets on top portions of partitions between target chambers, thereby causing formed thin film having the in-plane magnetic anisotropy.

6. The method according to claim 3, wherein the security functional thin film is deposited on a surface of a substrate or on a surface of a substrate already incorporated with security information.

7. A security product containing a security information layer, said security information layer comprising at least the security functional thin film of claim 1.

8. The security product according to claim 7, wherein the security information layer comprises a composite structure having two or more layers of the security functional thin film, the two or more layers of the security functional thin film being same or different.

9. The security product according to claim 8, wherein the security information layer comprises a composite layer having a sandwich structure; upper and lower layers thereof are the security functional thin films that are same or different, and an intermediate layer thereof is a metal layer.

10. The security product according to claim 8, wherein the security information layer comprises a composite structure having more than two layers of the security functional thin film with metal layers interposed therebetween.

11. The security product according to claim 7, wherein a surface of the security functional thin film is attached with a security layer containing a luminescent material, thereby forming a composite structure.

12. The security product according to claim 11, wherein the luminescent material is a photoluminescent material, a cathode ray luminescent material, an electroluminescent material, an X-ray luminescent material, a thermoluminescent material, or a combination thereof.

13. The security product according to claim 7, further comprising a substrate to support the security information layer; the substrate containing as an component thereof, or being attached on a surface thereof, a luminescent material; said luminescent material being a photoluminescent material, a cathode ray luminescent material, an electroluminescent material, an X-ray luminescent material, a thermoluminescent material, or a combination thereof.

14. The security product according to claim 7, wherein the security information layer is a composite structure including at least one layer of the security functional thin film and an optical holographic film, wherein the security functional thin film replaces an aluminum optical reflection layer.

15. The security product according to claim 14, wherein the optical holographic film is a hard-pressed holographic film or a soft-pressed holographic film.

16. The security product according to claim 7, wherein the security information layer is a composite structure including at least one layer of the security functional thin film and an optically variable thin film.

17. The security product according to claim 16, wherein the optically variable thin film has a structure of absorption layer-dielectric layer-reflection layer.

18. The security product according to claim 7, wherein the security product is a security strip or a security marker that can be position-fixedly placed in a sheet of paper.

19. The security product according to claim 18, wherein the security marker is a security thread or a security tape.

20. The method according to claim 4, wherein the security functional thin film is deposited on a surface of a substrate or on a surface of a substrate already incorporated with security information.

\* \* \* \* \*